United States Patent
Jones et al.

(10) Patent No.: US 11,157,707 B2
(45) Date of Patent: Oct. 26, 2021

(54) NATURAL LANGUAGE RESPONSE IMPROVEMENT IN MACHINE ASSISTED AGENTS

(71) Applicant: International Business Machines Corporation, Armonk, NY (US)

(72) Inventors: Steven Ware Jones, Astoria, NY (US); Jennifer A. Mallette, Vienna, VA (US); Arjun Jauhari, Jersey City, NJ (US); Vivek Salve, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 16/519,859

(22) Filed: Jul. 23, 2019

(65) Prior Publication Data
US 2021/0026924 A1 Jan. 28, 2021

(51) Int. Cl.
*G06F 40/56* (2020.01)
*G06F 40/30* (2020.01)
(Continued)

(52) U.S. Cl.
CPC ............ *G06F 40/56* (2020.01); *G06F 40/295* (2020.01); *G06F 40/30* (2020.01); *G06F 40/20* (2020.01); *G06F 40/35* (2020.01)

(58) Field of Classification Search
CPC .......... G06F 40/30; G06F 40/35; G06F 40/20; G06F 40/295
See application file for complete search history.

(56) References Cited

U.S. PATENT DOCUMENTS

| 9,002,773 B2 * | 4/2015 | Bagchi ............... G06F 16/31 706/52 |
| 9,245,008 B2 | 1/2016 | Clark et al. |

(Continued)

FOREIGN PATENT DOCUMENTS

| CN | 105868313 A | 8/2016 |
| CN | 106933809 A | 7/2017 |

(Continued)

OTHER PUBLICATIONS

International Searching Authority, PCT/IB2020/056378, dated Oct. 21, 2020.

(Continued)

*Primary Examiner* — Samuel G Neway
(74) *Attorney, Agent, or Firm* — Garg Law Firm, PLLC; Rakesh Garg; John Noh

(57) ABSTRACT

Using a personal entity analyzer, a personal entity difference between a natural language response to a natural language query and an edited version of the natural language response is scored, the natural language response selected from a set of natural language response recommendations. Using a product entity analyzer, a product entity difference between the natural language response and the edited version of the natural language response is scored. Using a sentence similarity analyzer, a sentence similarity between the natural language response and the edited version of the natural language response is scored. Based on the personal entity difference score, the product entity difference, score and the sentence similarity score, the set of natural language responses is updated. In a natural language interaction, a selected natural language response from the set of natural language responses is outputted.

20 Claims, 11 Drawing Sheets

(51) Int. Cl.
*G06F 40/295* (2020.01)
*G06F 40/20* (2020.01)
*G06F 40/35* (2020.01)

(56) References Cited

U.S. PATENT DOCUMENTS

| | | | |
|---|---|---|---|
| 9,639,522 B2 | 5/2017 | Dogrultan et al. | |
| 10,162,816 B1* | 12/2018 | Banerjee | G06F 40/35 |
| 2010/0324908 A1* | 12/2010 | Rosser | G10L 15/22 |
| | | | 704/270 |
| 2011/0213642 A1* | 9/2011 | Makar | G06Q 30/02 |
| | | | 705/7.38 |
| 2014/0006012 A1 | 1/2014 | Zhou et al. | |
| 2014/0122619 A1 | 5/2014 | Duan | |
| 2017/0371861 A1* | 12/2017 | Barborak | G06N 3/006 |
| 2018/0032503 A1* | 2/2018 | Swart | G06F 16/219 |
| 2018/0131645 A1 | 5/2018 | Magliozzi et al. | |
| 2018/0137854 A1* | 5/2018 | Perez | G06F 40/35 |
| 2019/0065499 A1* | 2/2019 | Wagstaff | G06F 16/24522 |
| 2021/0026924 A1* | 1/2021 | Jones | G06F 40/56 |

FOREIGN PATENT DOCUMENTS

| | | |
|---|---|---|
| EP | 2506151 A1 | 10/2012 |
| WO | 2018214163 A1 | 11/2018 |

OTHER PUBLICATIONS

U.S. Appl. No. 16/519,859, filed Jul. 23, 2019.
U.S. Appl. No. 16/519,795, filed Jul. 23, 2019.
Xu et al., "A New Chatbot for Customer Service on Social Media," Proceedings of the 2017 CHI Conference on Human Factors in Computing Systems (CHI '17). ACM, New York, NY, USA, 3506-3510.
Huang et al., "Evorus: A Crowd-powered Conversational Assistant Built to Automate Itself Over Time," Proceedings of the 2018 CHI Conference on Human Factors in Computing Systems (CHI '18). ACM, New York, NY, USA, Paper 295, 13 pages.

* cited by examiner

NATURAL LANGUAGE RESPONSE IMPROVEMENT IN MACHINE ASSISTED AGENTS

TECHNICAL FIELD

The present invention relates generally to a method, system, and computer program product for natural language response recommendation. More particularly, the present invention relates to a method, system, and computer program product for natural language response improvement in machine assisted agents.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, and is also referred to as a Question and Answer system (Q and A system). Cognitive analytics is the process of analyzing available information or knowledge to create, infer, deduce, or derive new information.

A chatbot or conversational interface is software that conducts a natural language conversation with a human user. Typically, the natural language conversation is conducted in text form. However, input to the chatbot can also be converted from another modality, such as speech, into text for processing, then output from the chatbot converted back into speech a human can hear. Chatbots are typically used to aid in customer service or information acquisition.

Chatbots are typically implemented in two forms. Retrieval-based chatbots use a repository of pre-defined responses. In particular, a retrieval-based chatbot takes, as input, a context (the conversation up to this point) and a potential response. To find a good response, the chatbot scores multiple potential responses within the repository and chooses the response with the highest score. Generative chatbots can generate responses that are not in a repository of pre-defined responses. However, today's generative chatbots tend to make grammatical mistakes, require large amounts of training data, produce irrelevant, generic or inconsistent responses, and are hard to optimize An agent assist tool is a variation on a chatbot. An agent assist tool receives natural language input and provides one or more recommended natural language responses to the input. Often, a set of recommended natural language responses is provided in the form of a ranked list. However, an agent performs the final steps of selecting a recommended response, and editing the response if necessary, before the tool provides the response to a human user. In addition, an edited response is not provided back to the tool for use in improving the set of recommended natural language responses. An agent assist tool is typically used to help an agent interacting with a customer, in speech or text form. The illustrative embodiments contemplate agent assist tools to become available in humanoid forms as well where the interaction would be a face-to-face or human-to-human-like interaction between a human and a humanoid.

Chatbots and agent assist tools are referred to collectively as conversational systems. In conversational systems, a natural language utterance supplied to the system is referred to as a query. A query need not be a grammatical question, or be grammatically correct, but may also be any natural language word or phrase. A response is a natural language utterance supplied by the system in response to a query. A response also need not be a complete sentence or grammatically correct, but may be any natural language word or phrase. A query and a response to the query constitute a query-response pair. Both queries and responses may be in the form of text, speech, or another form of natural language communication.

SUMMARY

The illustrative embodiments provide a method, system, and computer program product. An embodiment includes a method that scores, using a personal entity analyzer, a personal entity difference between a natural language response to a natural language query and an edited version of the natural language response, the natural language response selected from a set of natural language response recommendations, wherein the personal entity analyzer detects an instance of a named entity referencing a person in a portion of narrative text. An embodiment scores, using a product entity analyzer, a product entity difference between the natural language response and the edited version of the natural language response, wherein the product entity analyzer detects an instance of a named entity referencing a product in a portion of narrative text. An embodiment scores, using a sentence similarity analyzer, a sentence similarity between the natural language response and the edited version of the natural language response, wherein the sentence similarity analyzer measures a similarity between two portions of narrative text. An embodiment updates, based on the personal entity difference score, the product entity difference, score and the sentence similarity score, the set of natural language responses. An embodiment outputs, in a natural language interaction, a selected natural language response from the set of natural language responses, such that the natural language interaction uses the selected natural language response within a flow of the natural language interaction.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
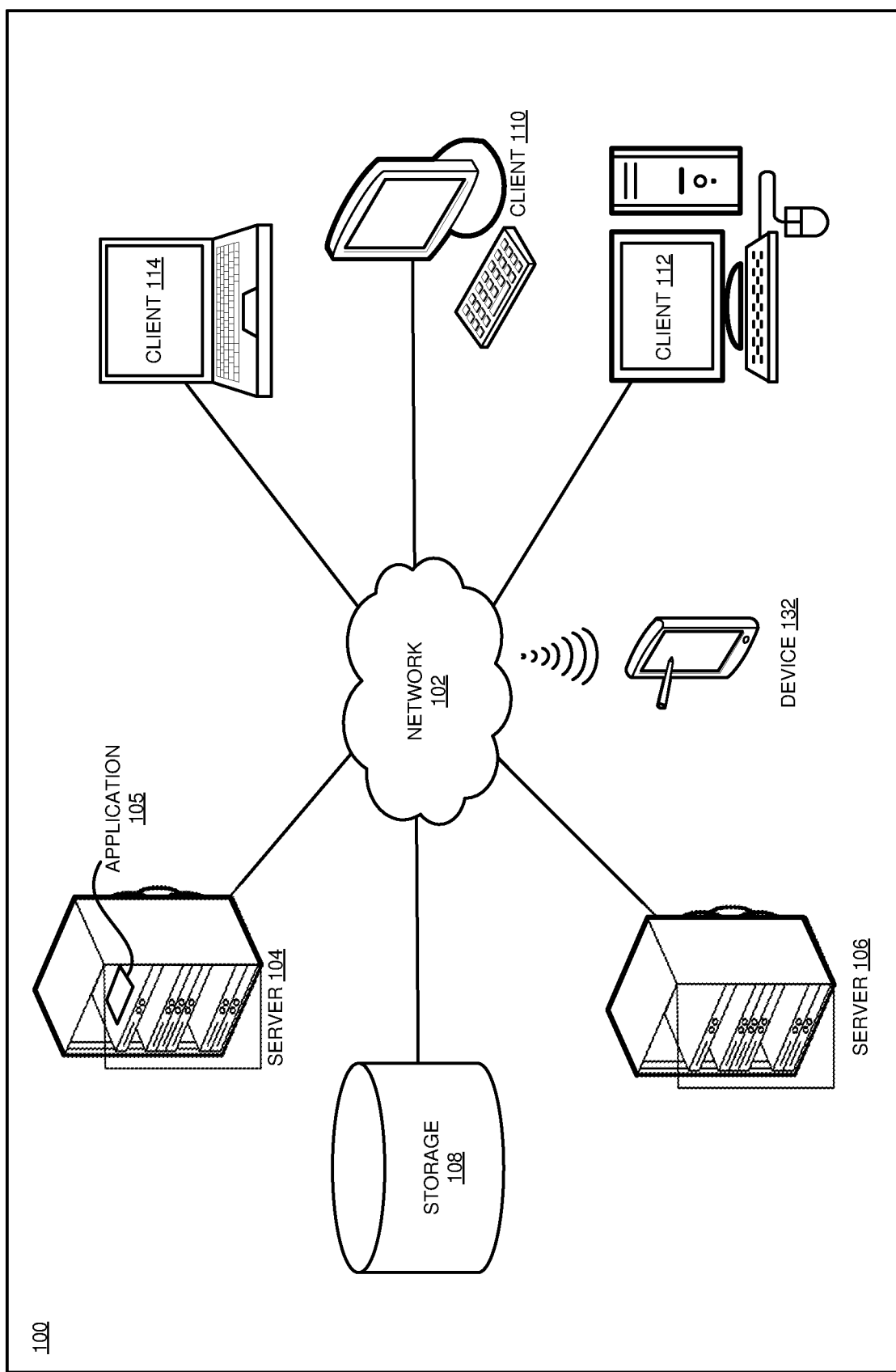
FIG. 1 depicts a block diagram of a network of data processing systems in which illustrative embodiments may be implemented.

The illustrative embodiments recognize that, to be effective at responding to natural language queries, retrieval-based agent assist tools must have a robust dataset of potential responses from which to select. An agent assist tool can learn a set of potential responses from training on a dataset of natural language interactions, for example transcripts of online chats, online question-and-answer forums, transcripts of telephone conversations, and other sources of natural language interaction data.

However, the illustrative embodiments recognize that an agent assist tool trained in this manner will suffer from deficiencies. Because the tool is limited to responses that were present in the training data, the tool cannot be adapted to a new situation without additional training. For example, an agent assist tool used in a customer service role must be updated to assist with queries about each new product, and any new versions of an existing product. As another example, elements of natural language, such as terms for items and expected levels of politeness, can vary across geographies. For example, the footwear known as "running shoes" or "sneakers" in the United States are often referred to as "trainers" in Britain. Thus, an agent assist tool trained using data of one geography might require additional training before being used in a different geography.

An agent assist tool provides recommended responses which an agent can further edit. By editing a response before sending, an agent can update a recommended response for a new product or product release, adapt a recommended response to a context a tool might not have analyzed correctly, correct a recommended response that includes a grammatical error, personalize a recommended response, and generally compensate for any training or natural language understanding inadequacy of the tool. However, even if an agent often makes similar edits to a recommended response, a pre-trained tool cannot be adapted to learn from the edits. Repeatedly making the same edits—for example, to account for new product pricing—must be performed quickly enough to keep response latency within a range that preservers the interactivity of the interaction. In addition, making recipient-specific edits while interacting with several customers at once is also error prone, particularly if response speed must also be maintained.

Consequently, the illustrative embodiments recognize that there is an unmet need for a recommended response set of an agent assist tool to be updatable, adaptable, and to learn from agents' edits to the recommended response set.

The illustrative embodiments recognize that the presently available tools or solutions do not address these needs or provide adequate solutions for these needs. The illustrative embodiments used to describe the invention generally address and solve the above-described problems and other problems related to natural language response improvement in machine assisted agents.

An embodiment can be implemented as a software application. The application implementing an embodiment can be configured as a modification of an existing agent assist tool, as a separate application that operates in conjunction with an existing agent assist tool, a standalone application, or some combination thereof.

Particularly, some illustrative embodiments provide a method that scores differences between a recommended response to a natural language query and an edited version of the response, and updates a stored set of recommended responses according to the scored differences.

An embodiment includes a set of recommended natural language responses to natural language queries. The set of recommended responses may have been extracted from a dataset of natural language interactions, machine-generated, human-generated, or generated by another method or combination of methods. An embodiment seeks to improve the set of recommended responses, using agents' edits to responses while servicing specific queries.

An embodiment receives, for analysis, a recommended natural language response from the set of recommended responses. An embodiment also receives, for analysis, an edited version of the same recommended natural language response. An embodiment can also be configured to receive, to assist in the analysis if available, the natural language query to which the natural language response is intended to respond. An embodiment can also be configured to receive, to assist in the analysis if available, any preceding queries and responses within the same interaction as the recommended response being analyzed. An embodiment can also be configured to receive, to assist in the analysis if available, metadata about the interaction of which the recommended response is a part. The query, preceding queries and responses, and metadata provide additional context for use in the analysis.

As used herein, a named entity is a real-world object that can be denoted with a proper name. A named entity also includes a placeholder denoting where a particular named entity can be inserted into a template. A personal entity is a named entity that references a particular person or legal entity treated as a person (e.g. a corporation). Thus, for example, "John", "John Doe", "IBM Corporation", and "{first_name}" (a placeholder in a template) are all personal entities. A product entity is a named entity that references a particular product, product version, or other product-related noun. Thus, for example, if Product X is a product and Gold is a version of Product X, "Product X", "Product X Gold", and "the Gold version" are all product entities.

As used herein, a named entity analyzer detects an instance of a named entity in a portion of narrative text. Thus, a personal entity analyzer detects an instance of a personal entity in a portion of narrative text, and a product entity analyzer detects an instance of a product entity in a portion of narrative text. Techniques for extracting and classifying named entities, including personal and product entities, are currently commercially available. For example, several such techniques are Natural Language Toolkit (NLTK), Stanford Name Entity Recognition (NER), and Watson Natural Language Understanding. (Watson is a registered trademark of International Business Machines Corporation in the United States and other countries.)

An embodiment uses a personal entity analyzer to detect one or more instances of a personal entity in the recommended response and the edited recommended response. Then an embodiment compares detected personal entity instances in the recommended response with detected personal entity instances in the edited recommended response, to determine a number of personal entity instances that have changed. For example, if a recommended response is "Hi, {first_name}" and the edited version is "Hi, Jenny", "{first_name}" has been changed to "Jenny", thus the edited version contains one personal entity change. As another example, editing a recommended response from "Hi, {first_name}" to "Hi, John Doe" results in two personal entity changes: "{first_name}" has been replaced by "John", a first name, and "Doe", a person's last name, has been added. An embodiment uses the number of personal entity instances that have changed as a personal entity difference score.

An embodiment uses a product entity analyzer to detect one or more instances of a product entity in the recommended response and the edited recommended response. Then an embodiment compares detected product entity instances in the recommended response with detected product entity instances in the edited recommended response, to determine a number of product entity instances that have changed. For example, if a recommended response is "Product X Gold comes with text analytics" and the edited version is "Product X Professional comes with text analytics", "Gold" has been changed to "Professional", thus the edited version contains one product entity change. As another example, editing a recommended response from "The price of Product X Gold is $100" to "The price of Product X Professional is $200" results in two product entity changes: "Gold" has been changed to "Professional", and the price has changed from $100 to $200. An embodiment uses the number of product entity instances that have changed as a product entity difference score.

An embodiment uses a sentence similarity analyzer to score a similarity between the recommended response and the edited recommended response. A sentence similarity determines a measure of semantic similarity for two portions of narrative text. The portions of narrative text need not be grammatical sentences, but can be any grouping of natural language text that includes at least one word. One method of computing a sentence similarity is to convert the recommended response and the edited recommended response to corresponding numerical representations, such as vectors, then compare the numerical representations. For example, cosine similarity measures an angle between two vectors, thus measuring a similarity between the vectors. Two vectors are maximally similar, or identical, when the angle between them is 0, and are increasingly dissimilar as the angle between them increases above 0. Converting a unit of narrative text, such as a word or sentence, to a vector representation is referred to as computing and embedding corresponding to the unit of narrative text. Techniques for measuring sentence similarity by computing a sentence embedding for each sentence, then computing a similarity between the two embeddings, are known. Techniques for measuring sentence similarity by computing a word embedding for each word in each sentence, combining the word embeddings for each sentence, then computing a similarity between the two combinations of word embeddings, are known as well.

An embodiment classifies the edited recommended response based on the personal entity difference score, the product entity difference score, and the sentence similarity score. Then an embodiment updates the set of recommended responses based on the embodiment's classification of the type of edit performed on the edited recommended response.

An embodiment uses, as one of the edit classifications, edits to a recommended response which are to be ignored. An embodiment considers a single personal entity change to indicate that the recommended response has been edited to incorporate a personalization, for example adapting a template response to be directed at a particular named person. Because such a personalization is unlikely to improve a set of recommended response intended to apply to all customers, an embodiment ignores edits in which only one personal entity has been changed, i.e. a personal entity difference score equal to one.

An embodiment uses, as one of the edit classifications, edits to a recommended response which are considered improvements to a recommended response. An embodiment considers a single product entity change to indicate an improvement to a recommended response, for example to add or correct product information. To determine whether the edit represents an addition or a correction, and take appropriate action for each, an embodiment uses a context of the recommended response.

In particular, an embodiment performs a product entity analysis on the query immediately prior to the recommended response, i.e. the query to which the recommended response is responding. If the query included the same product entity as the recommended response, but the product entity was changed to create the edited response, an embodiment assumes that the edited response is meant as an feature update to the recommended response and replaces the recommended response with the edited version in the set of recommended responses. For example, for a query, "Does Product X Gold come with text analytics?", a recommended response might be, "Product X Gold comes with text analytics" and an edited version of the recommended response might be "Product X Professional comes with text analytics." Here, because both the query and the recommended response include the same product entity ("Product X Gold"), but in the edited response "Product X Gold" was changed to "Product X Professional", an embodiment assumes that the change was meant as a feature update, likely because Product X Gold has been replaced by Product X Professional. As a result, the embodiment replaces the recommended response with the edited version in the set of recommended responses.

If, instead, the query included the same product entity as the edited response but not the original recommended response, an embodiment assumes that the edited response is meant as a product update to the recommended response and adds the edited version to the set of recommended responses while retaining the original recommended response. For example, for a query, "Does Product X Professional come with text analytics?", a recommended response might be, "Product X Gold comes with text analytics" and an edited version of the recommended response might be "Product X Professional comes with text analytics." Here, because the product entity ("Product X Professional") in the query was changed to "Product X Gold" in the recommended response and then changed back to "Product X Professional" in the edited response, an embodiment assumes that the change is meant as an update to the product knowledge in the set of recommended responses to cover features of Product X Professional. As a result, an embodiment adds the edited response to the set of recommended responses.

An embodiment uses, as one of the edit classifications, edits to a recommended response which are considered low-meaning changes to a recommended response. An embodiment considers a low-meaning change to be one for which a sentence similarity score between the recommended response and the edited recommended response, determined in a manner described herein, is above a threshold similarity score. One non-limiting example of a threshold similarity score is 0.9, where the similarity score is determined using a 0-1 range. An embodiment assumes that when two responses have a similarity score above a high threshold, the two responses have essentially the same meaning and differ by only minor grammar or style changes. An example of a minor grammar change might be editing a recommended response, "The price of Product X are . . . " to "The price of Product X is . . . ". An example of a minor style change might be editing a recommended response, "Hello, my name is . . . " to "Hi, my name is . . . ". An embodiment uses grammar parsing to determine whether a grammar change is an improvement or a defect. Grammar parsing identifies a part of speech for each word in a portion of narrative text, such as a response or edited response, and uses one or more parsing trees to identify if the text being evaluated passes a set of grammar rules. There are several grammar parsers commercially available, for example the Stanford Natural Language Processing Group Stanford Parser. An embodiment can eliminate either the original response or the edited version if the parser determines that one is grammatically valid and the other is not.

An embodiment also considers a low-meaning change to be one for which the personal entity difference score is above one, meaning that there was more than one personal entity difference between the recommended response and the edited response. For example, if a recommended response, "Hi, {first_name}, can I have your email address'?" was edited to read, "Hi, John Doe, can I have your email address?", the personal entity difference score for this change would be two, because "{first_name}" was changed to "John" and "Doe", an additional personal entity, was added.

If an embodiment classifies an edit as a low-meaning change, the embodiment conducts an AB test on both the recommended response and the edited version. An AB test, as used herein, is an experiment in which two or more variants of a response are presented to users at random, and statistical analysis used to determine which variant performs better for a given goal. A non-limiting example of a goal is a rate of customer satisfaction with a response or an overall interaction. Another non-limiting example of a goal is a rate at which customers buy a product following an interaction including a response variant. Once data for a statistically significant number of interactions including the variants has been collected, an embodiment retains one or more of the best-performing variants in the set of recommended responses, and deletes the remaining variants. Thus, an embodiment uses AB testing to determine which of a number of semantically similar responses performs best according to a goal, and keeps the best of the group of semantically similar responses.

An embodiment uses, as one of the edit classifications, edits to a recommended response which are considered high-meaning changes to a recommended response. An embodiment considers a high-meaning change to be one for which a sentence similarity score between the recommended response and the edited recommended response, determined in a manner described herein, is below a threshold similarity score—for example, 0.9 using a 0-1 range. An embodiment assumes that when two responses have a similarity score below a threshold, the two responses do not have essentially the same meaning. For example, editing a recommended response, "The best feature of Product X is its text analytics capability" to "The best feature of Product X is its numerical analysis package" is a non-limiting example of a high-meaning change, because "text analytics capability" is not above a threshold semantic similarity to "numerical analysis package". Another non-limiting example of a high-meaning change is editing a recommended response, "The price of Product X is $100" to "The price of Product X is $100. And the main features are . . . ", because the edited response includes an additional sentence detailing feature information.

An embodiment also considers a high-meaning change to be one for which the product entity difference score is above one, meaning that there was more than one product entity difference between the recommended response and the edited response. For example, if a recommended response, "The price of Product X Gold is $100" was edited to read, "The price of Product X Professional is $200", the product entity difference score for this change would be two, because "Product X Gold" was changed to "Product X Professional" and the price was changed.

If an embodiment classifies an edit as a high-meaning change, the embodiment retains the recommended response and adds the edited version to the set of response recommendations. Retaining both versions keeps the set of recommended response up to date as information within the responses, such as product versions, features, and pricing, changes over time.

An embodiment is configurable to include additional, or fewer, edit classifications. An embodiment is also configurable to perform different, or additional actions in response to edit classifications. An embodiment is configurable to implement changes to the set of recommended responses based on a particular geography, or without a geographic limitation. Restricting changes to a particular geography ensures that geography-specific updates are only implemented for the geography to which they apply. One non-limiting example of a geography-specific update is price information in a particular local currency. Another non-limiting example of a geography-specific update implements a preference in one region for addressing customers by their first name, while retaining a preference in another region for addressing customers by their title and last name.

An embodiment also includes additional functionality. In particular, an embodiment determines a response timing for a natural language interaction. The response timing is within a time range between an upper threshold and a lower threshold, where the thresholds are chosen to avoid responding either too quickly or too slowly to a query. Both too-fast and too-slow responses detract from the interactive nature of the interaction. The embodiment forms a set of edited recommended responses, selects an edited response from the set, and automatically outputs the selected edited response in the interactive conversation on behalf of the agent—all within the chosen response timing.

The manner of agent assist tool described herein is unavailable in the presently available methods in the technological field of endeavor pertaining to conversational systems. A method of an embodiment described herein, when implemented to execute on a device or data processing system, comprises substantial advancement of the functionality of that device or data processing system in analyzing and scoring differences between a recommended response to a natural language query and an edited version of the response, and updates a stored set of recommended responses according to the scored differences.

The illustrative embodiments are described with respect to certain types of entities, analyses, similarities, differences, scores, thresholds, queries, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
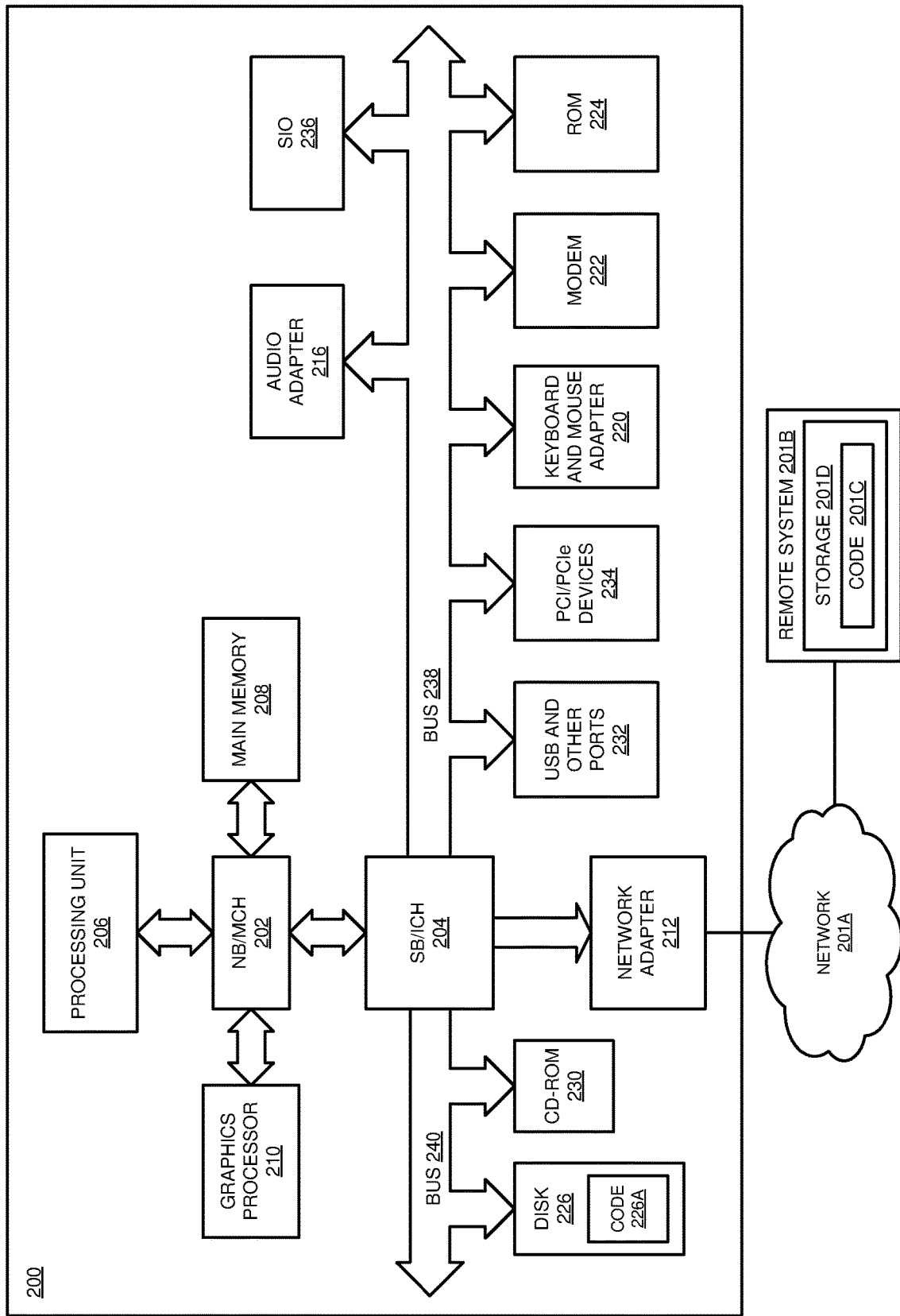
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132. A set of recommended responses can be stored in storage 108 or in any other suitable location.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
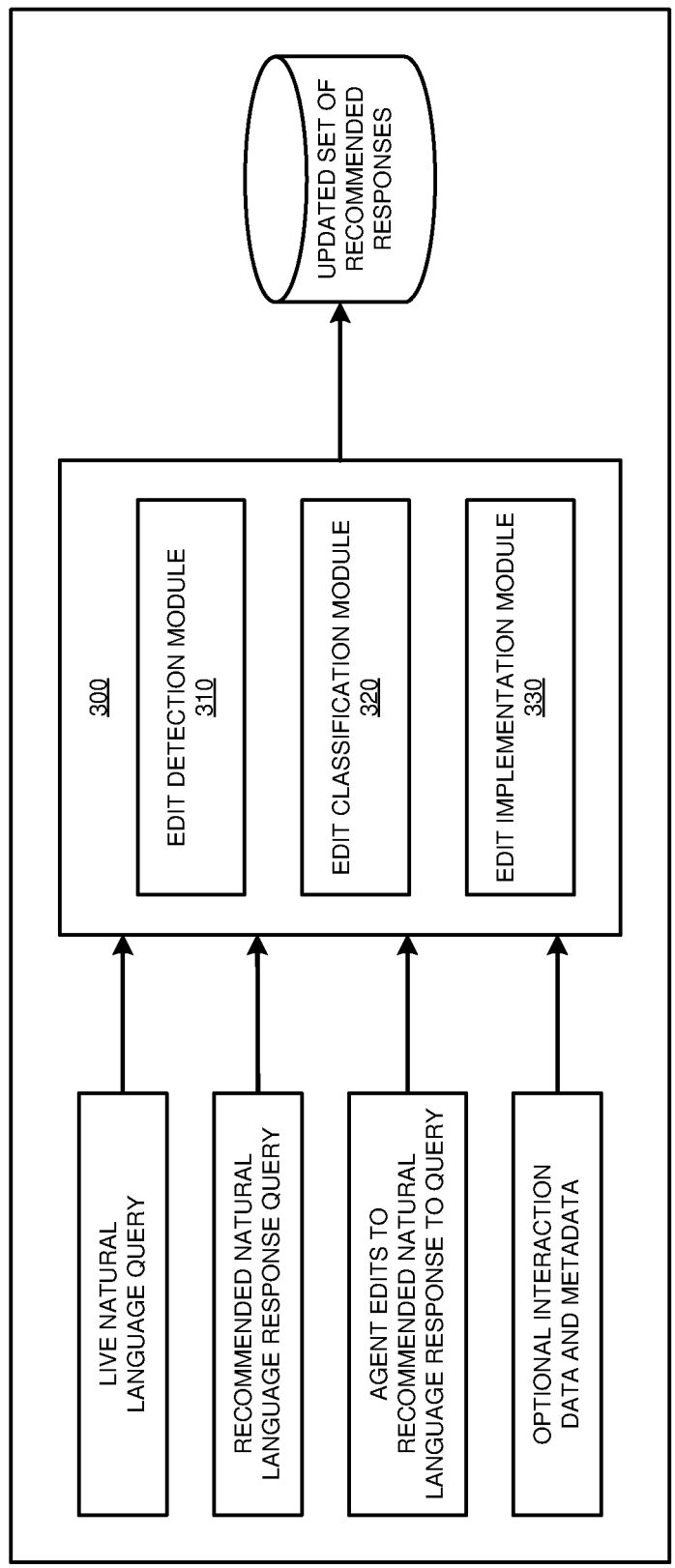
FIG. 3 depicts a block diagram of an example configuration for natural language response.

With reference to FIG. 3, this figure depicts a block diagram of an example configuration for natural language response improvement in machine assisted agents in accordance with an illustrative embodiment. Application 300 is an example of application 105 in FIG. 1 and executes in any of servers 104 and 106, clients 110, 112, and 114, and device 132 in FIG. 1.

Application 300 receives, for analysis, a recommended natural language response from the set of recommended responses. Application 300 also receives, for analysis, an edited version of the same recommended natural language response. Application 300 can also be configured to receive, to assist in the analysis if available, the natural language query to which the natural language response is intended to respond. Application 300 can also be configured to receive, to assist in the analysis if available, any preceding queries and responses within the same interaction as the recommended response being analyzed, and metadata about the interaction of which the recommended response is a part. The query, preceding queries and responses, and metadata provide additional context for use in the analysis.

Edit detection module 310 analyzes a recommended response and edited version of the recommended response, and determines a personal entity difference score, product entity difference score, and sentence similarity score for the changes between the response and the edited version. Edit classification module 320 classifies the edited recommended response based on the personal entity difference score, the product entity difference score, and the sentence similarity score. Edit implementation module 330 updates the set of recommended responses based on module 320's classification of the type of edit performed on the edited recommended response.

Figure 4:
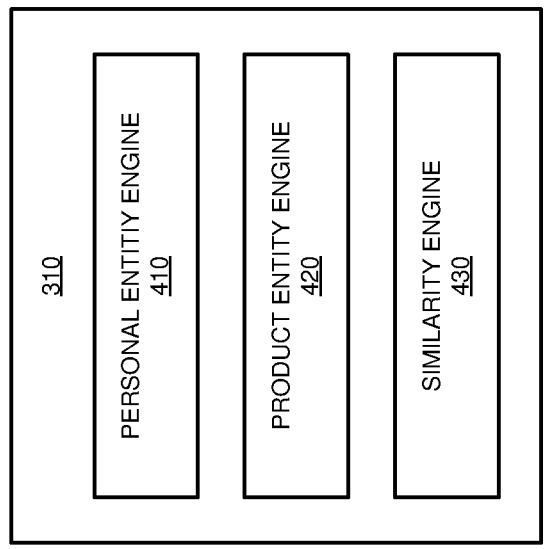
FIG. 4 depicts a block diagram of an example configuration for natural language response improvement in machine assisted agents in accordance with an illustrative embodiment.

With reference to FIG. 4, this figure depicts a block diagram of an example configuration for natural language response improvement in machine assisted agents in accordance with an illustrative embodiment. In particular, FIG. 4 provides more detail of module 310 in FIG. 3.

Personal entity module 410 uses a personal entity analyzer to detect one or more instances of a personal entity in the recommended response and the edited recommended response. Then module 410 compares detected personal entity instances in the recommended response with detected personal entity instances in the edited recommended response, to determine a number of personal entity instances that have changed. Module 410 uses the number of personal entity instances that have changed as a personal entity difference score.

Product entity engine 420 uses a product entity analyzer to detect one or more instances of a product entity in the recommended response and the edited recommended response. Then module 420 compares detected product entity instances in the recommended response with detected product entity instances in the edited recommended response, to determine a number of product entity instances that have changed. Module 420 uses the number of product entity instances that have changed as a product entity difference score.

Similarity engine 430 uses a sentence similarity analyzer to score a similarity between the recommended response and the edited recommended response. In particular, module 430 converts the recommended response and the edited recommended response to corresponding vectors, then computes a cosine similarity between the vectors.

Figure 5:
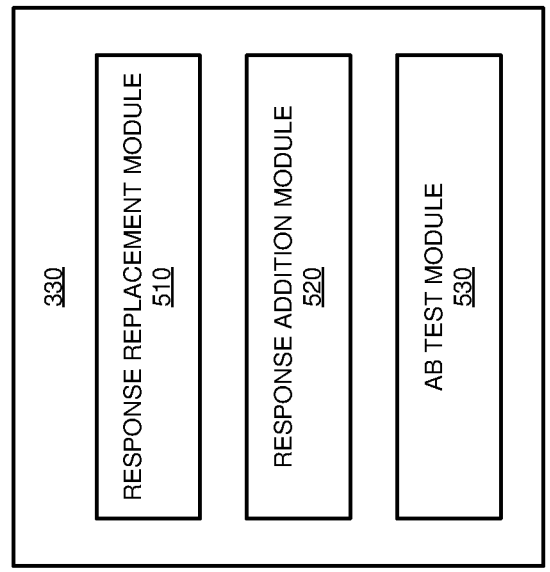
FIG. 5 depicts a block diagram of an example configuration for natural language response improvement in machine assisted agents in accordance with an illustrative embodiment.

With reference to FIG. 5, this figure depicts a block diagram of an example configuration for natural language response improvement in machine assisted agents in accordance with an illustrative embodiment. In particular, FIG. 5 provides more detail of module 330 in FIG. 3.

If the product entity difference score equals one, the query included the same product entity as the recommended response, but the product entity was changed to create the edited response, response replacement module 510 replaces the recommended response with the edited version in the set of recommended responses. If the product entity difference score equals one and the query includes the same product entity as the edited response but not the original recommended response, response addition module 520 adds the edited version to the set of recommended responses while retaining the original recommended response.

If a sentence similarity score between the recommended response and the edited recommended response, determined in a manner described herein, is above a threshold similarity score, application 300 determines that a low-meaning change to a recommended response has been made. Application 300 also considers a low-meaning change to be one for which the personal entity difference score is above one, meaning that there was more than one personal entity difference between the recommended response and the edited response. If application 300 classifies an edit as a low-meaning change, AB test module 530 conducts an AB test on both the recommended response and the edited version. Once data for a statistically significant number of interactions including the variants has been collected, module 530 retains one or more of the best-performing variants in the set of recommended responses, and deletes the remaining variants.

If a sentence similarity score between the recommended response and the edited recommended response, determined in a manner described herein, is below a threshold similarity score, application 300 determines that a high-meaning change to a recommended response has been made. Application 300 also considers a high-meaning change to be one for which the product entity difference score is above one, meaning that there was more than one product entity difference between the recommended response and the edited response. If application 300 classifies an edit as a high-meaning change, response addition module 520 retains the recommended response and adds the edited version to the set of response recommendations.

Figure 6:
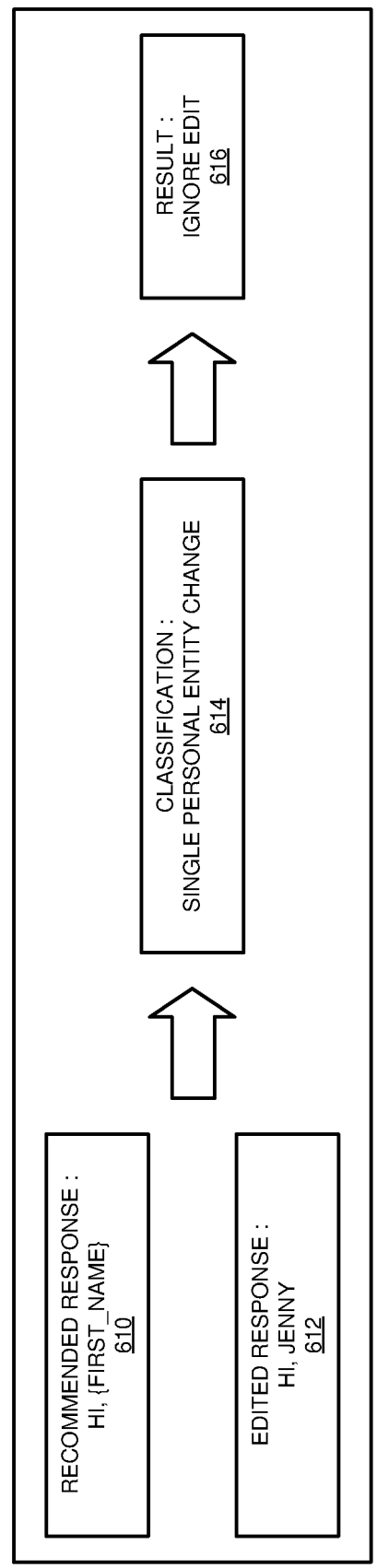
FIG. 6 depicts an example of natural language response improvement in machine assisted agents in accordance with an illustrative embodiment.

With reference to FIG. 6, this figure depicts an example of natural language response improvement in machine assisted agents in accordance with an illustrative embodiment. The example can be executed using application 300 in FIG. 3.

As depicted, recommended response 610 is "Hi, {first_name}", and edited response 612, corresponding to response 610, is "Hi, Jenny". Here, because "{first_name}" has been changed to "Jenny", application 300 determines classification 614: editing response 610 into response 612 has resulted in one personal entity change. Result 616 depicts the result of classification 614: the edit is ignored, and recommended response 610 remains in the set of recommended responses.

Figure 7:
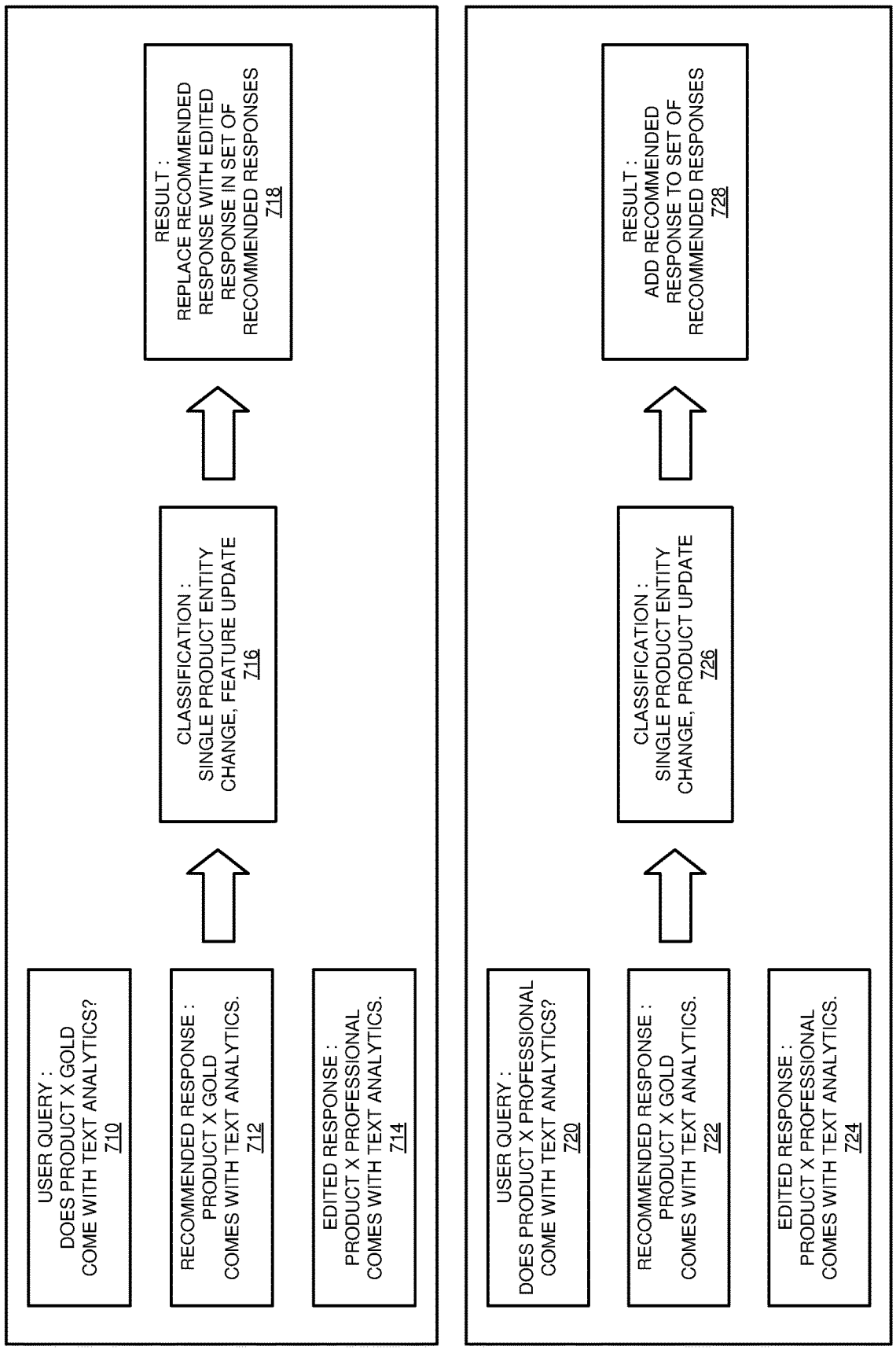
FIG. 7 depicts examples of natural language response improvement in machine assisted agents in accordance with an illustrative embodiment.

With reference to FIG. 7, this figure depicts examples of natural language response improvement in machine assisted agents in accordance with an illustrative embodiment. The example can be executed using application 300 in FIG. 3.

As depicted, for query 710, "Does Product X Gold come with text analytics?", recommended response 712 is, "Product X Gold comes with text analytics" and edited response 714 is "Product X Professional comes with text analytics." Here, because both query 710 and recommended response 712 include the same product entity ("Product X Gold"), but in edited response 714 "Product X Gold" was changed to "Product X Professional", application 300 produces classification 716: a single product entity change meant as a feature update, likely because Product X Gold has been replaced by Product X Professional. Result 718 depicts the result of classification 716: application 300 replaces recommended response 712 with edited response 714 in the set of recommended responses.

However, for query 720, "Does Product X Professional come with text analytics?", recommended response 722 is, "Product X Gold comes with text analytics" and edited response 724 is "Product X Professional comes with text analytics." Here, because the product entity ("Product X Professional") in query 720 was changed to "Product X Gold" in recommended response 722 and then changed back to "Product X Professional" in edited response 724, application 300 produces classification 726: a single product entity change meant as an update to the product knowledge in the set of recommended responses to cover features of Product X Professional. Result 728 depicts the result of classification 726: application 300 adds edited response 724 to the set of recommended responses.

Figure 8:
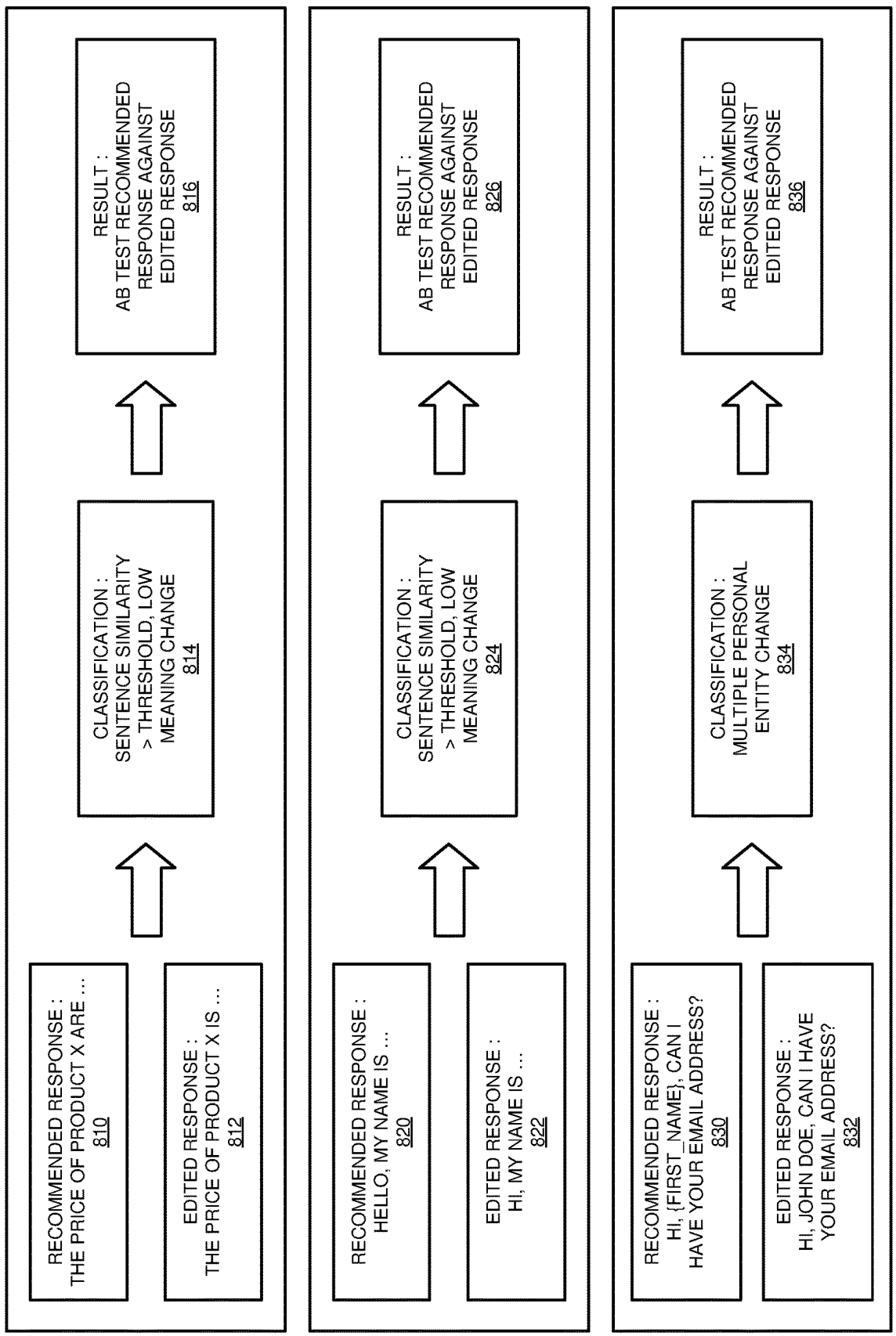
FIG. 8 depicts examples of natural language response improvement in machine assisted agents in accordance with an illustrative embodiment.

With reference to FIG. 8, this figure depicts examples of natural language response improvement in machine assisted agents in accordance with an illustrative embodiment. The example can be executed using application 300 in FIG. 3.

FIG. 8 depicts an example of a minor grammar change: recommended response 810, "The price of Product X are . . . " has been changed to edited response 812, "The price of Product X is . . . ". Application 300 has determined classification 814: a sentence similarity score between recommended response 810 and edited response 812 is above a threshold similarity score, so this is a low-meaning change. Result 816 depicts the result of classification 814: application 300 performs an AB test for recommended response 810 and edited response 812 to determine which is best.

FIG. 8 also depicts an example of a minor style change: recommended response 820, "Hello, my name is . . . " has been changed to edited response 822, "Hi, my name is . . . ". Application 300 has determined classification 824: a sentence similarity score between recommended response 820 and edited response 822 is above a threshold similarity score, so this is a low-meaning change. Result 826 depicts the result of classification 824: application 300 performs an AB test for recommended response 820 and edited response 822.

FIG. 8 also depicts an example of multiple personal entity changes: recommended response 830, "Hi, {first_name}, can I have your email address'?" has been changed to edited response 832, "Hi, John Doe, can I have your email address'?" Application 300 has determined classification 834: the personal entity difference score for this change would be two, because "{first_name}" was changed to "John" and "Doe", an additional personal entity, was added. Thus, this is a low-meaning change. Result 836 depicts the result of classification 834: application 300 performs an AB test for recommended response 830 and edited response 832 to determine which is best.

Figure 9:
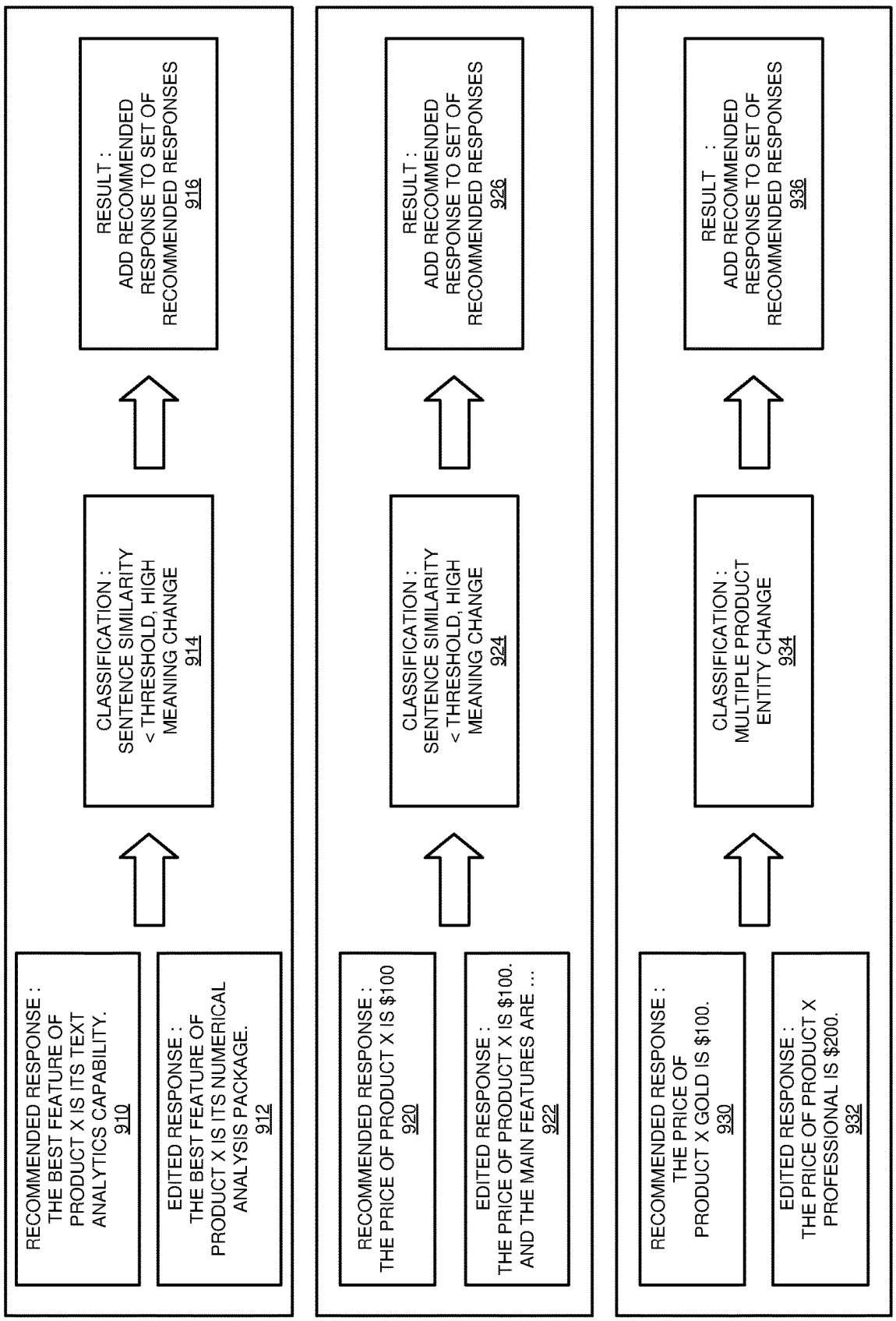
FIG. 9 depicts examples of natural language response improvement in machine assisted agents in accordance with an illustrative embodiment.

With reference to FIG. 9, this figure depicts examples of natural language response improvement in machine assisted agents in accordance with an illustrative embodiment. The example can be executed using application 300 in FIG. 3.

FIG. 9 depicts recommended response 910, "The best feature of Product X is its text analytics capability" and edited response 912, "The best feature of Product X is its numerical analysis package". Application 300 has determined classification 914: this is a high-meaning change, because "text analytics capability" is not above a threshold semantic similarity to "numerical analysis package". Result 916 depicts the result of classification 914: application 300 adds edited response 912 to the set of recommended responses.

FIG. 9 also depicts recommended response 920, "The price of Product X is $100" and edited response 922, "The price of Product X is $100. And the main features are . . . ." Application 300 has determined classification 924: this is a high-meaning change, because edited response 922 includes an additional sentence detailing feature information. Result 926 depicts the result of classification 924: application 300 adds edited response 922 to the set of recommended responses.

FIG. 9 also depicts an example of multiple product entity changes: recommended response 930, "The price of Product X Gold is $100," was changed to edited response 932, "The price of Product X Professional is $200." Application 300 has determined classification 934: the product entity difference score for this change is two, because "Product X Gold" was changed to "Product X Professional" and the price was changed. Thus, this is a high-meaning change. Result 936 depicts the result of classification 934: application 300 adds edited response 932 to the set of recommended responses.

Figure 10:
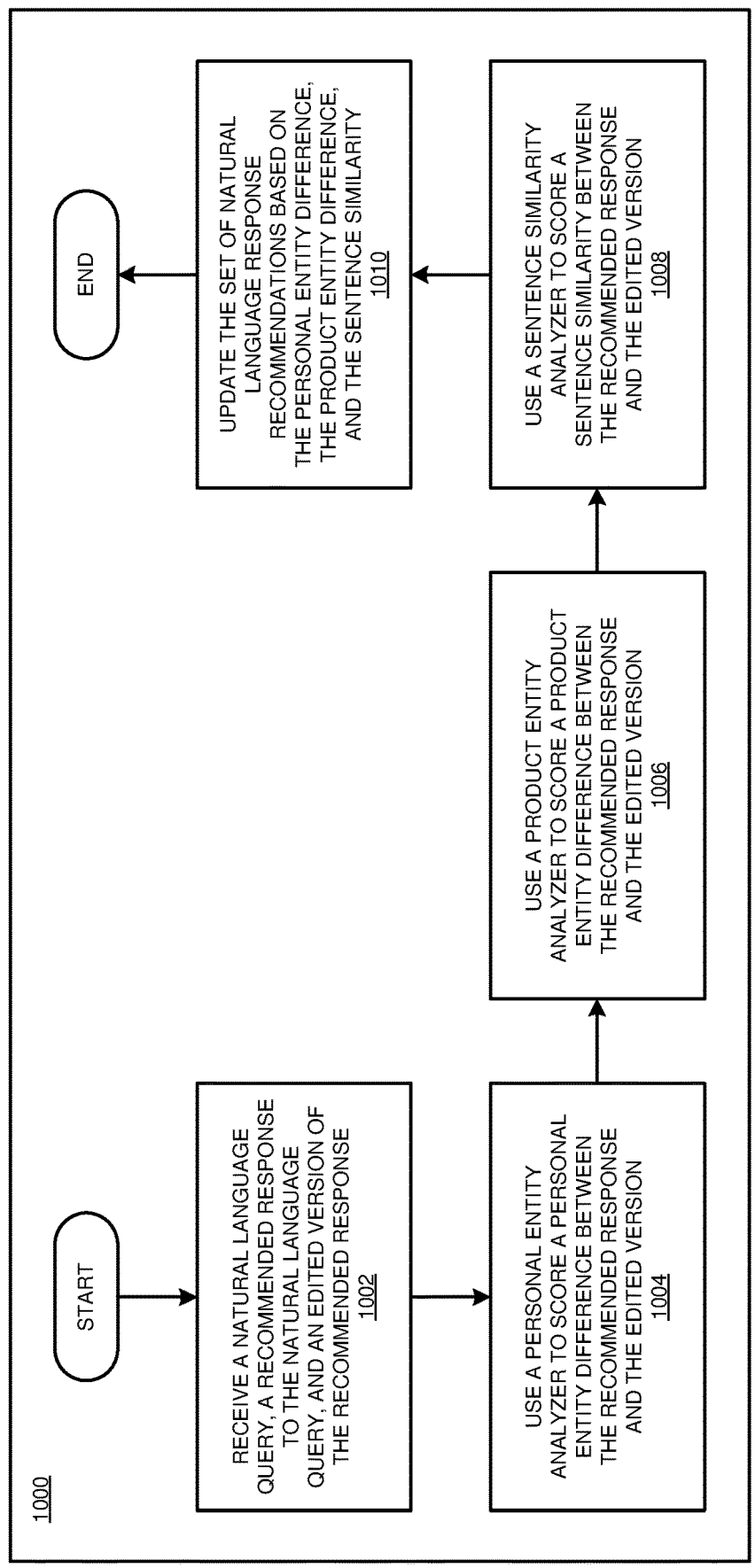
FIG. 10 depicts a flowchart of an example process for natural language response improvement.

With reference to FIG. 10, this figure depicts a flowchart of an example process for natural language response improvement in machine assisted agents in accordance with an illustrative embodiment. Process 1000 can be implemented in application 300 in FIG. 3.

In block 1002, the application receives a natural language query, a recommended response to the natural language query, and an edited version of the recommended response. In block 1004, the application uses a personal entity analyzer to score a personal entity difference between the recommended response and the edited version. In block 1006, the application uses a product entity analyzer to score a product entity difference between the recommended response and the edited version. In block 1008, the application uses a sentence similarity analyzer to score a sentence similarity between the recommended response and the edited version. In block 1010, the application updates the set of natural language response recommendations based on the personal entity difference, the product entity difference, and the sentence similarity. Then the application ends.

Figure 11:
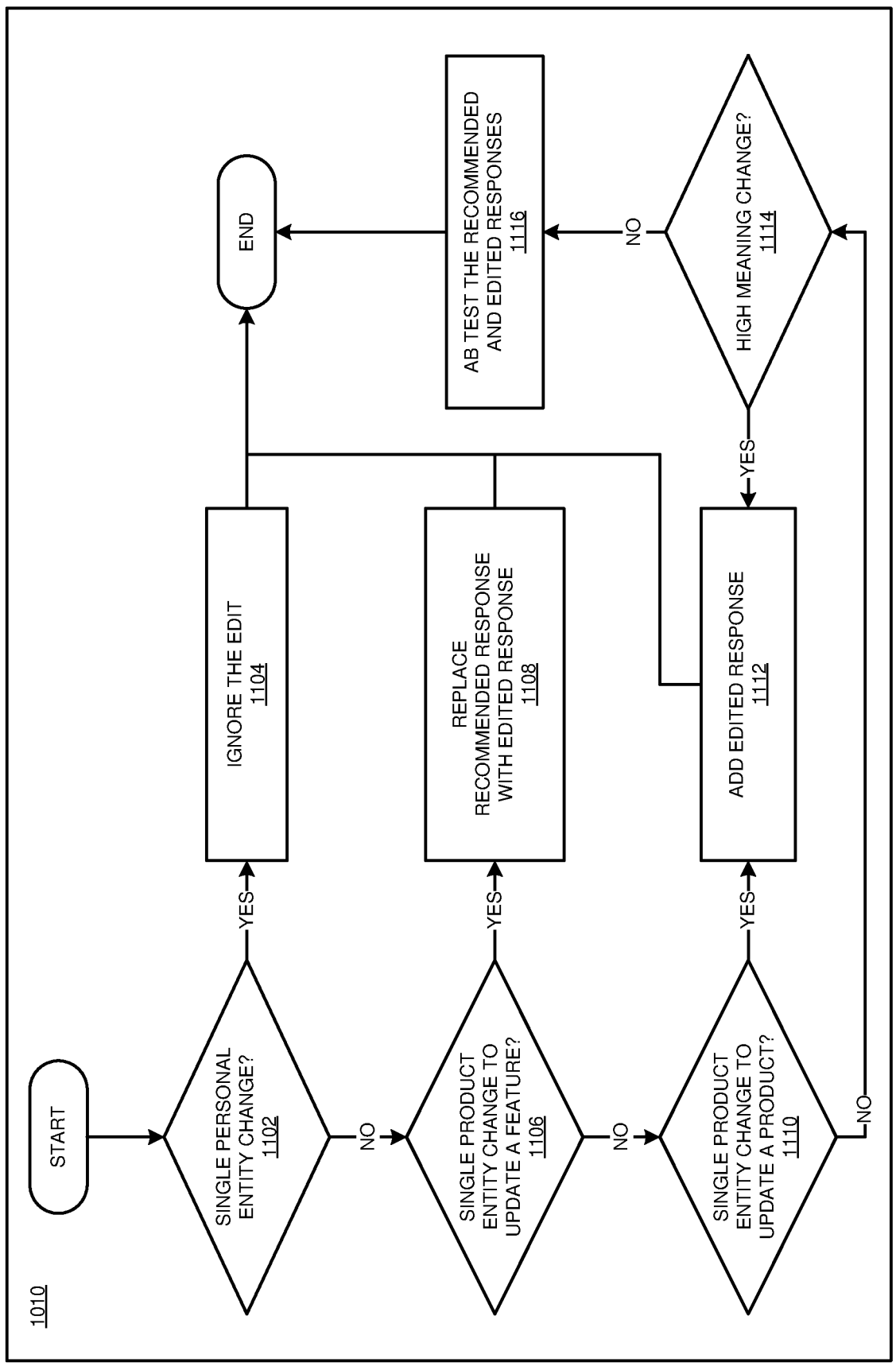
FIG. 11 depicts a flowchart of an example process for natural language response improvement in machine assisted agents in accordance with an illustrative embodiment.

With reference to FIG. 11, this figure depicts a flowchart of an example process for natural language response improvement in machine assisted agents in accordance with an illustrative embodiment. In particular, FIG. 11 depicts more detail of block 1010 in FIG. 10.

In block 1102, the application checks whether a single personal entity change was detected. If yes ("YES" path of block 1102), in block 1104 the application ignores the edit, then ends. If not ("NO" path of block 1102), in block 1106 the application checks whether a single product entity has changed to update a feature. If yes ("YES" path of block 1106), in block 1108 the application replaces the recommended response with the edited version, then ends. If not ("NO" path of block 1106), in block 1110 the application checks whether a single product entity has changed to update a product. If yes ("YES" path of block 1110), in block 1112 the application adds the edited response to the set of recommended responses, then ends. If not ("NO" path of block 1110), in block 1114 the application checks whether a high-meaning change has been detected. If yes ("YES" path of block 1114), in block 1112 the application adds the edited response to the set of recommended responses, then ends. If not ("NO" path of block 1114), in block 1116 the application AB tests the recommended and edited versions of the response, then ends.

Thus, a computer implemented method, system or apparatus, and computer program product are provided in the illustrative embodiments for natural language response improvement in machine assisted agents and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based email), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    scoring, using a personal entity analyzer, a personal entity difference between a natural language response to a natural language query and an edited version of the natural language response, the natural language response selected from a set of natural language response recommendations, wherein the personal entity analyzer detects an instance of a named entity referencing a person in a portion of narrative text;
    scoring, using a product entity analyzer, a product entity difference between the natural language response and the edited version of the natural language response, wherein the product entity analyzer detects an instance of a named entity referencing a product in a portion of narrative text;
    scoring, using a sentence similarity analyzer, a sentence similarity between the natural language response and the edited version of the natural language response, wherein the sentence similarity analyzer measures a similarity between two portions of narrative text;
    updating, based on the personal entity difference score, the product entity difference score, and the sentence similarity score, the set of natural language response recommendations; and
    outputting, in a natural language interaction, a selected natural language response from the set of natural language response recommendations, such that the natural language interaction uses the selected natural language response within a flow of the natural language interaction.

2. The computer-implemented method of claim 1, wherein the updating comprises replacing the natural language response with the edited version of the natural language response in the set of natural language response recommendations.

3. The computer-implemented method of claim 2, wherein the replacing is performed responsive to the product entity difference score being equal to one.

4. The computer-implemented method of claim 1, wherein the updating comprises adding the edited version of the natural language response to the set of natural language response recommendations.

5. The computer-implemented method of claim 4, wherein the adding is performed responsive to the product entity difference score being equal to one.

6. The computer-implemented method of claim 4, wherein the adding is performed responsive to the similarity score being below a threshold.

7. The computer-implemented method of claim 1, wherein the updating comprises:
    comparing result data of responding to a live natural language query with the natural language response with responding to the live natural language query with the edited version of the natural language response; and
    retaining, based on the result data, one of the natural language responses and the edited version of the natural language response in the set of natural language response recommendations.

8. The computer-implemented method of claim 7, wherein the comparing and retaining are performed responsive to the similarity score being above a threshold.

9. A computer usable program product comprising one or more computer-readable storage devices, and program instructions stored on at least one of the one or more storage devices, the stored program instructions comprising:
    program instructions to score, using a personal entity analyzer, a personal entity difference between a natural language response to a natural language query and an edited version of the natural language response, the natural language response selected from a set of natural language response recommendations, wherein the personal entity analyzer detects an instance of a named entity referencing a person in a portion of narrative text;

program instructions to score, using a product entity analyzer, a product entity difference between the natural language response and the edited version of the natural language response, wherein the product entity analyzer detects an instance of a named entity referencing a product in a portion of narrative text;

program instructions to score, using a sentence similarity analyzer, a sentence similarity between the natural language response and the edited version of the natural language response, wherein the sentence similarity analyzer measures a similarity between two portions of narrative text;

program instructions to update, based on the personal entity difference score, the product entity difference score, and the sentence similarity score, the set of natural language response recommendations; and program instructions to output, in a natural language interaction, a selected natural language response from the set of natural language response recommendations, such that the natural language interaction uses the selected natural language response within a flow of the natural language interaction.

10. The computer usable program product of claim 9, wherein the updating comprises program instructions to replace the natural language response with the edited version of the natural language response in the set of natural language response recommendations.

11. The computer usable program product of claim 10, wherein the replacing is performed responsive to the product entity difference score being equal to one.

12. The computer usable program product of claim 9, wherein the updating comprises program instructions to add the edited version of the natural language response to the set of natural language response recommendations.

13. The computer usable program product of claim 12, wherein the adding is performed responsive to the product entity difference score being equal to one.

14. The computer usable program product of claim 12, wherein the adding is performed responsive to the similarity score being below a threshold.

15. The computer usable program product of claim 9, wherein the updating comprises:

program instructions to compare result data of responding to a live natural language query with the natural language response with responding to the live natural language query with the edited version of the natural language response; and program instructions to retain, based on the result data, one of the natural language responses and the edited version of the natural language response in the set of natural language response recommendations.

16. The computer usable program product of claim 15, wherein the comparing and retaining are performed responsive to the similarity score being above a threshold.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to score, using a personal entity analyzer, a personal entity difference between a natural language response to a natural language query and an edited version of the natural language response, the natural language response selected from a set of natural language response recommendations, wherein the personal entity analyzer detects an instance of a named entity referencing a person in a portion of narrative text;

program instructions to score, using a product entity analyzer, a product entity difference between the natural language response and the edited version of the natural language response, wherein the product entity analyzer detects an instance of a named entity referencing a product in a portion of narrative text;

program instructions to score, using a sentence similarity analyzer, a sentence similarity between the natural language response and the edited version of the natural language response, wherein the sentence similarity analyzer measures a similarity between two portions of narrative text;

program instructions to update, based on the personal entity difference score, the product entity difference score, and the sentence similarity score, the set of natural language response recommendations; and program instructions to output, in a natural language interaction, a selected natural language response from the set of natural language response recommendations, such that the natural language interaction uses the selected natural language response within a flow of the natural language interaction.

20. The computer system of claim 19, wherein the updating comprises program instructions to replace the natural language response with the edited version of the natural language response in the set of natural language response recommendations.

* * * * *